United States Patent [19]

Miller et al.

[11] 3,966,461

[45] June 29, 1976

[54] SELECTIVE REMOVAL OF BISMUTH FROM OXIDIZED PARTICULATE MATERIALS

[75] Inventors: Jan D. Miller; Juan Luis Sepulveda Jimenez, both of Salt Lake City, Utah

[73] Assignee: The University of Utah, Salt Lake City, Utah

[22] Filed: Mar. 17, 1975

[21] Appl. No.: 559,119

[52] U.S. Cl. .............................. 75/101 R; 75/112; 75/114; 75/120; 75/121; 423/87
[51] Int. Cl.² ........................................ C22B 30/06
[58] Field of Search .................. 75/101 R, 112, 114, 75/121, 120; 423/87

[56] References Cited
UNITED STATES PATENTS

| | | | |
|---|---|---|---|
| 1,360,271 | 11/1920 | Cullen et al. | 423/87 |
| 1,477,321 | 12/1923 | Darling | 423/87 |

*Primary Examiner*—G. Ozaki

[57] ABSTRACT

A process for the removal and recovery of bismuth from oxidized particulate materials, such as flue dust residue and/or roasted concentrates, the process including selectively solubilizing bismuth with an acidic chloride leach at an elevated temperature and thereafter separating the solubilized bismuth from the remaining metallic values in the residue.

5 Claims, 3 Drawing Figures

SELECTIVE REMOVAL OF BISMUTH FROM OXIDIZED PARTICULATE MATERIALS

BACKGROUND

1. Field of the Invention

This invention relates to the selective dissolution of bismuth from oxidized particulate materials using an acidic chloride solution.

2. The Prior Art

A common source of particulate matter having a recoverable quantity of metallic values is flue dust which is the extremely finely divided particulate matter that is recovered by filtration and electrostatic precipitation from the exhaust stacks of smelters, furnaces or the like. Generally, the primary metal constituent of the smelting operation is also reflected as the primary metal constituent of the flue dust. Accordingly, the recovery and extraction of metal values from flue dust represents an important economic consideration in the extractive metals industry.

For example, flue dust from a typical smelter is captured by conventional filter systems and may be processed to recover the metal values. Processing may involve a selective sulfation roast at about 450°C. In the case of flue dust from a zinc smelter, the principal products from the roasting process are zinc oxide, cadmium sulfate, and lead sulfate. Lesser amounts of other metallic compounds are also present. Typically, water and sulfuric acid soluble metallic compounds are dissolved and their values recovered by appropriate solution purification techniques.

A water leach of the roasted flue dust results in a dissolution of approximately 80% of the water-soluble compounds. The undissolved residue from the water leach is next subjected to dilute sulfuric acid leach to dissolve most of the acid-soluble compounds. The undissolved residue from this acid leach is referred to in the industry as lead cake residue, an example of the type of material with which this invention is concerned.

Residues such as lead cake residue contain a significant amount of silver (sometimes in excess of 100 ounces per ton) and the residue may, therefore, represent a valuable product for its silver content alone. For example, a typical analysis of lead cake residue from a zinc smelter revealed the following metallic content: lead 44.22%, zinc 2.72%, cadmium 0.93%, copper 0.95%, antimony 0.019%, arsenic 0.065%, indium 0.015%, bismuth 0.051% and silver at 109 ounces per ton. Nonmetallic elements in chemical combination with the metals complete the remainder of the percentage analysis.

The full economic potential of such residues frequently cannot be realized due to the penalties imposed for the bismuth content or due to undeveloped technology for the recovery of major components. Flue dust from a zinc smelter is one example in which the bismuth content is generally considered to be an impurity and its removal is, therefore, required due to product specifications. Specifically, lead smelters frequently will not accept secondary raw materials such as flue dusts containing more than about 0.02% bismuth. The reason for this penalty is that bismuth is known to interfere with the recovery of silver values from lead cake residue and also alter the physical properties of the metallic lead particularly with respect to its ductility. Consequently, such residues must be sold elsewhere at less than the premium price it would otherwise demand if the bismuth were not present or were present in amounts less than about 0.02%.

Until the present invention, the removal of bismuth from residues has generally not been commercially practiced successfully because of deficient technology and economic factors encountered. For example, a bismuth content of 0.051%, as in the foregoing zinc smelter lead cake residue, does not represent a realistic level for recovering bismuth as a metallic value, although the removal of bismuth to a level less than 0.02% would contribute significantly to enhancing the value of the lead cake residue.

On the other hand, other flue dust residues may contain a significant bismuth concentration whereby bismuth may be considered one of the primary metallic values. For example, flue dust from a copper smelting operation has been analyzed and found to contain approximately 3% bismuth. This residue has been stockpiled at one copper smelter alone in an accumulation that has amounted to approximately 10,000 tons. In this instance, the 3% bismuth level represents a significant metallic value of bismuth, the recovery of which should be given economic considerations provided the necessary technological processing can be developed such as is described in this invention.

In view of the foregoing, what is needed is a process to selectively separate and remove bismuth from oxidized particulate materials and waste products such as flue dust residues and roasted concentrates. The bismuth removal process should not substantially affect the silver content, but rather maintain the stability of lead and silver in the solid phase. Preferably, the process should include the selective dissolution of bismuth only, without substantially affecting the solubility of either the lead or silver content of the residue. Such an invention is disclosed herein.

BRIEF SUMMARY AND OBJECTS OF THE INVENTION

The present invention involves subjecting oxidized particulate materials such as flue dust residues or other roasted products or concentrates to an acidic chloride leach at elevated temperatures. The concentration of chloride ions in the leach solution is carefully controlled so as to significantly enhance the selective dissolution of the bismuth from the residue while simultaneously minimizing dissolution of lead and silver values.

The process preferentially includes analyzing the residue for metal values and thereafter formulating the composition of the liquor for the acidic chloride leach so as to obtain optimal dissolution of the bismuth.

It is therefore an object of this invention to provide improvements in the process for removing bismuth from oxidized particulate materials.

It is another object of this invention to provide improvements in the process for selectively dissolving bismuth from oxidized particulate materials containing silver and lead values.

An even still further object of this invention is to provide improvements in the process for the selective dissolution of bismuth in lead cake residues.

These and other objects and features of the present invention will become more fully apparent from the following description and appended claims taken in conjunction with the drawing.

DETAILED DESCRIPTION OF THE PREFERRED EMBODIMENT

Bismuth behaves chemically somewhat similar to silver particularly with respect to the solubility of its compounds. Accordingly, great care must be exercised to prevent the undue dissolution of silver compounds from the residue under treatment while attempting to selectively dissolve the bismuth compounds.

The present invention relates to the discovery that limited amounts of chloride ions in an acidic leach solution and at elevated temperatures substantially increases the preferential solubility of bismuth without significantly affecting the solubility of either the silver or the lead compounds. Higher levels of chloride ions have been found to significantly increase the solubility of the silver compounds, in particular. Accordingly, the practice of this invention requires that the incoming raw material or residue be assayed for its metals content so that the optimum chloride ion concentration of the acid chloride leach solution may be established. When used herein, acid chloride is defined to mean an acidic solution of chloride ions.

This invention, therefore, may preferentially include formulating an acidic chloride leach solution on the basis of the assaying step. For example, it has been found that for raw materials containing less than about 5% bismuth that 0.05 to 0.2 molar chloride ions is the optimal chloride ion concentration and higher bismuth levels may require higher chloride ion concentrations. However, as a precautionary note, increased dissolution of silver compounds is generally experienced as the chloride ion concentration in the leach liquor is increased significantly above 0.2 molar. By way of illustration, the optimal chloride ion concentration for the acidic chloride leach of a residue having about 0.05% bismuth was found to be 0.1 molar chloride ions.

As far as presently known, any soluble chloride can be used as the chloride ion source in practicing this invention, although sodium chloride is presently preferred since it is abundantly available and is relatively inexpensive.

Figure 1:
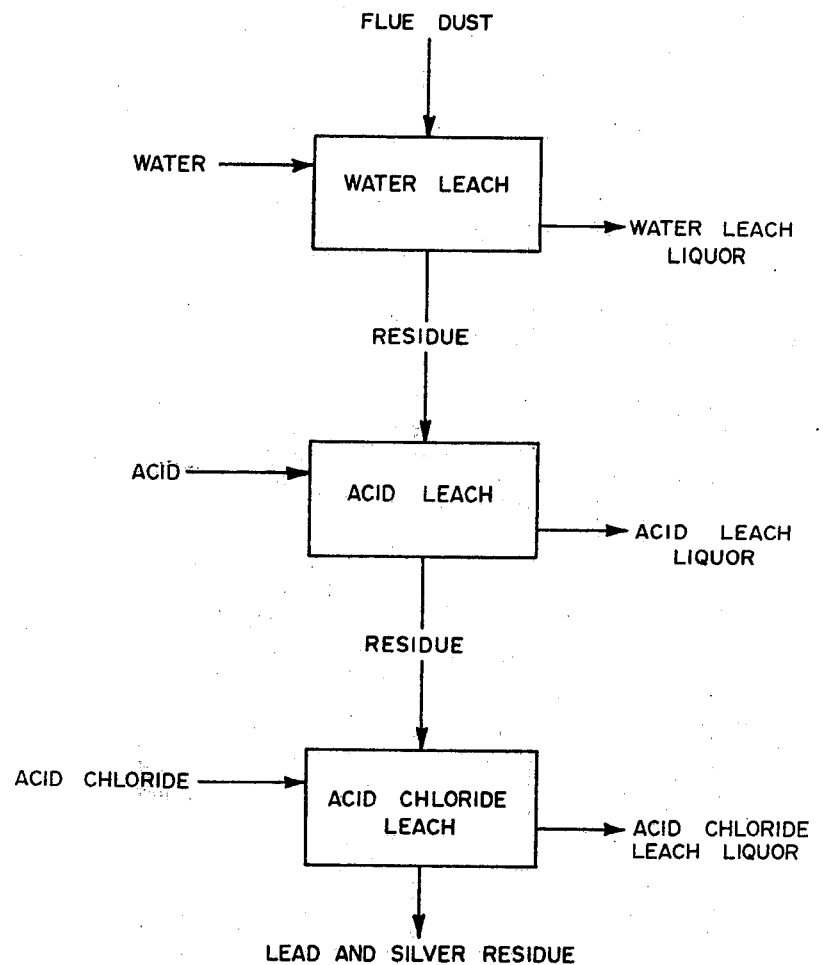
FIG. 1 is a schematic flow diagram of one process for extracting metal values from oxidized particulate materials, such as flue dust, including the novel process of the present invention.

Referring to FIG. 1, an oxidized particulate material may be provided as a roasted flue dust which may be first leached with water. A water leach serves to remove the water soluble metallic values such as cadmium and copper, with solubility depending on the degree of sulfation of the raw material and on the solubility of the metallic sulfates, basic sulfates, and oxides. The residue from the water leach may then be subjected to an acid leach using dilute sulfuric acid to remove sulfuric acid soluble metal values which were not removed by the water leach.

The residue remaining after the acid leach is preferably treated with an acid chloride leach to selectively dissolve the bismuth compounds thereby enabling the selective removal of bismuth contaminants and/or values from the residue. The resulting residue from this acid chloride leach generally demands a premium price based upon its silver content.

Although the illustrated embodiment is directed to one preferred process for treating flue dust, any suitable particulate metallic residue or concentrate may be advantageously treated by the novel process of this invention. Desirably, the residue is subjected to a roasting process to render the residue more amenable to the subsequent leaching steps.

Alternate processing schemes which incorporate this invention can be envisaged, such as a direct acid chloride leach in which all soluble constituents would be dissolved in one step. For example, this would be accomplished by substituting the acid chloride leach for either the water leach or the acid leach steps. In either of these latter instances the metallic values carried off in the leach liquor would, of course, be substantially altered and each would require appropriate treatment to recover the desired metallic values.

Other critical variables affecting the solubility of bismuth were found to be temperature and acid concentration. The dissolution of bismuth is enhanced significantly by an increase in the level of each of these variables. Significant silver dissolution occurs only at high chloride levels and appears to be relatively insensitive to increases in both temperature and acid concentration.

Figure 2:
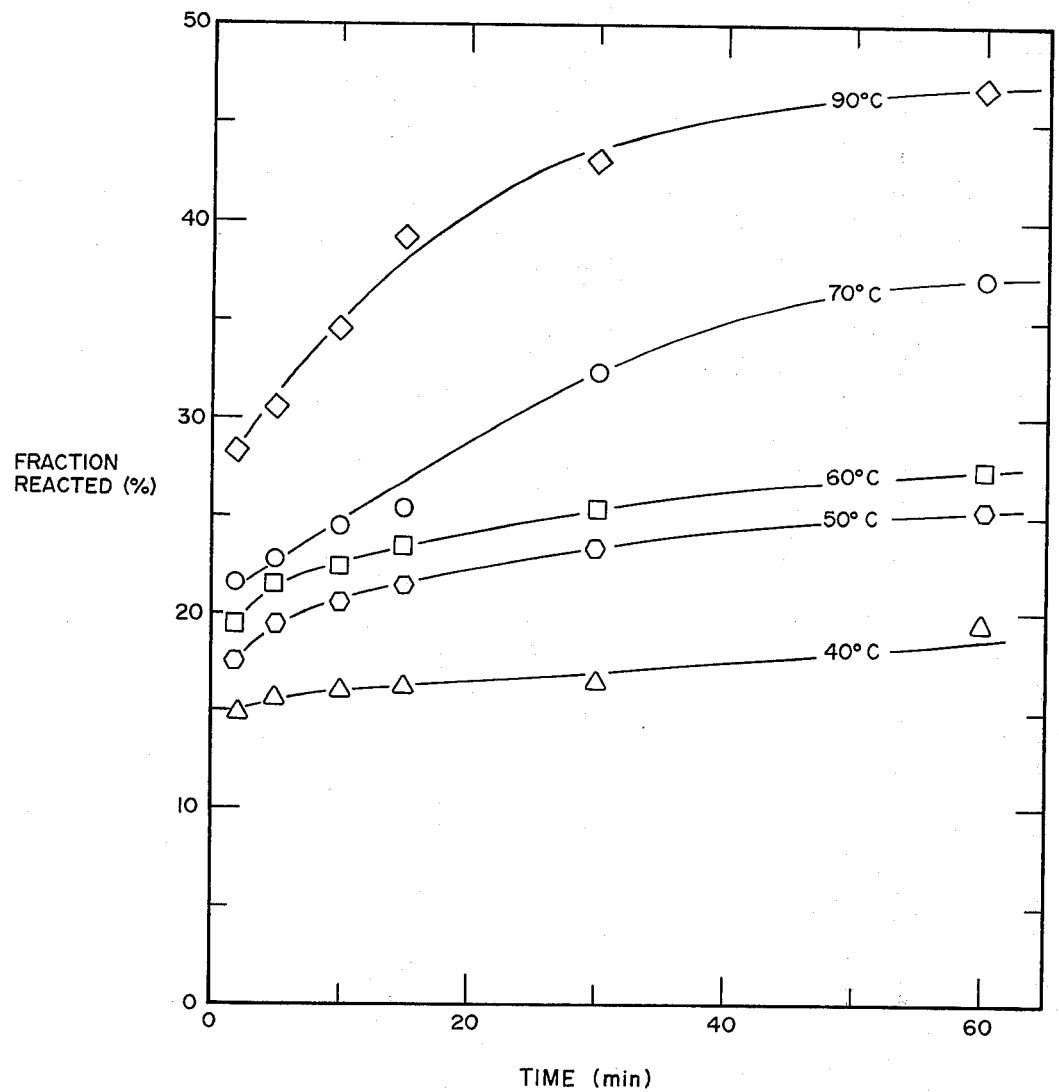
FIG. 2 is a graphical comparison of data as to percent bismuth dissolved per period of time for various temperatures at one acid concentration.

Referring to FIG. 2, a graphical comparison is made between the percent bismuth dissolved over a reaction time period of 60 minutes as a function of the temperature with the same acid concentration of 0.5 molar sulfuric acid. The data obtained for this comparison was done in the absence of chloride ions which accounts for the relatively low levels of bismuth dissolved.

FIG. 2 demonstrates that temperature increases significantly increase the percent bismuth dissolved by an acidic leach solution. It was noted that the initial dissolution reaction of bismuth occurs rapidly and the total extent of the bismuth dissolution increased with increasing temperature. For example, at 40°C approximately 15% of the bismuth was dissolved in the first two minutes while at 90°C almost 30% of the bismuth was dissolved during the first two minutes. After the initial surge, the bismuth dissolution reaction slows appreciably. For example, at 40°C the percent bismuth dissolved increased from 15% to only 20% in 1 hour while at 90°C, the amount of bismuth dissolved in one hour increased from about 30% to 47%. These results demonstrate the desirability of maintaining temperatures on the order of 70°C or greater.

Figure 3:
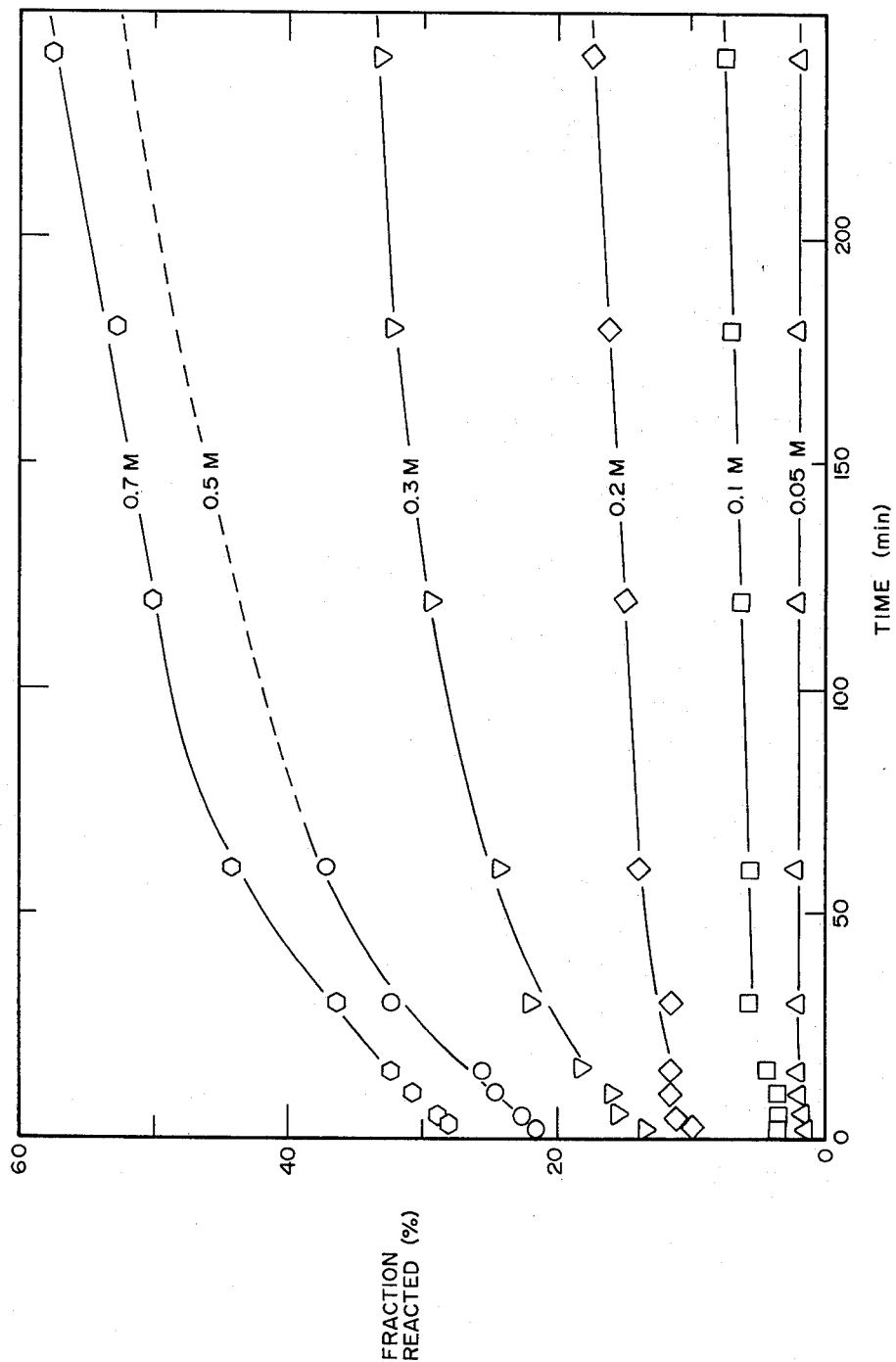
FIG. 3 is a graphical comparison of data as to percent bismuth dissolved per period of time for various acid concentrations at one temperature.

The effect of various acid concentrations on the percent bismuth dissolved was determined as a function of time and is graphically presented in FIG. 3. The determination was made at 70°C and also in the absence of chloride ions.

The data obtained for both of FIG. 2 and FIG. 3 was developed using 5% solids from a zinc smelter lead cake residue which was analyzed as having a 0.051% bismuth content.

Referring now more particularly to FIG. 3, it was found, for example, that an acid concentration of 0.1 molar sulfuric acid at a temperature of 70°C resulted in less than about 5% dissolution of bismuth. Even after four hours the percent bismuth dissolved remained substantially less than 10%. However, at 0.7 molar sulfuric acid it was found that 28% of the bismuth was released in the first two minutes and after four hours 58% of the bismuth had been dissolved. It was further found that for sulfuric acid concentrations greater than 1.0 molar the initial rate of bismuth dissolution was independent of the acid concentration and thereby demonstrates the importance of increased acid concentrations.

Although the precise mechanism is not completely understood, these results appear to indicate a change in the rate controlling step due to probable depletion of susceptible surface bismuth species on the surface of the residue particles. Depletion of these surface bismuth species may also account for the fact that at a given high acid concentration the initial rapid rate of dissolution is not sustained but rather decreased, in some instances rather abruptly, after the first two minutes of reaction.

The effects of stirring speed on the reaction kinetics was also examined. It was found that the kinetic response of the system was almost insensitive to changes in the stirring speed regardless of reactor used. This can be rationalized on the basis that the residue particles are so small that their inertial effects are minimal. That is, the relative velocity between the liquid and the solid phase is not changed significantly even by drastic changes in the stirring speed since the tested particles of zinc smelter flue dust residue essentially act as a part of the liquid phase due to their low inertia.

EXAMPLE 1

The chloride ion concentration was found to be critical and was determined for value ranges between 0.1 molar to 2.0 molar sodium chloride for zinc smelter lead cake residue having 0.051% bismuth. At the higher levels of chloride ions it was found that excessive quantities of silver were dissolved and therefore it was deemed that a chloride ion concentration of 2.0 molar was unacceptable for the present purposes.

Table I, below, sets forth the percentage of bismuth, silver, lead and zinc dissolved after a leaching period of 16 hours in response to various chloride ion and sulfuric acid concentrations and at various temperatures.

Although the results presented are for a 16 hour reaction time, it was found that the extent of reaction does not change significantly after about 4 hours digestion.

TABLE I

| ACID CHLORIDE LEACH (16 HOURS) OF LEAD CAKE RESIDUE CONTAINING 0.051% BISMUTH | | | | | | |
|---|---|---|---|---|---|---|
| Sodium Chloride Concentration (M) | Sulfuric Acid Concentration (M) | Temperaure (°C) | Percent Metal Dissolved | | | |
| | | | Bismuth | Silver | Lead | Zinc |
| 0.1 M | 0.01 M | 30°C | 1.56% | 0.04% | 0.07% | 18.78% |
| 0.1 | 0.01 | 70 | 1.95 | 0.35 | 0.07 | 23.35 |
| 0.1 | 1.0 | 30 | 46.09 | 0.15 | 0.06 | 35.53 |
| 0.1 | 1.0 | 70 | 86.33 | 0.35 | 0.09 | 63.95 |
| 1.05 | 0.505 | 50 | 80.73 | 4.35 | 0.72 | 50.24 |
| 2.0 | 0.01 | 30 | 38.28 | 10.52 | 7.85 | 21.56 |
| 2.0 | 0.01 | 70 | 44.92 | 6.0 | 7.95 | 25.38 |
| 2.0 | 1.0 | 30 | 56.64 | 11.69 | 1.02 | 31.97 |
| 2.0 | 1.0 | 70 | 89.84 | 14.22 | 4.77 | 80.19 |

EXAMPLE 2

The nature of the critical chloride ion concentration was also determined further at low chloride ion concentrations in an acidic chloride leach of zinc smelter flue dust residue. The evaluation was carried out with a 16 hour reaction time on 5% residue solids at 70°C and with a 0.5 molar sulfuric acid concentration. The results are tabulated in Table II, below:

TABLE II

| BISMUTH DISSOLUTION AT LOW CHLORIDE ION CONCENTRATIONS | |
|---|---|
| CHLORIDE ION CONCENTRATION | BISMUTH DISSOLVED |
| none | 52.7% |
| 0.05 M | 72.3% |
| 0.10 M | 80.9% |

The foregoing results were obtained for a zinc smelter flue dust residue having a typical analysis as indicated in Table III, below.

TABLE III

| ZINC SMELTER FLUE DUST RESIDUE ANALYSIS | |
|---|---|
| METAL | PERCENT |
| Bismuth | 0.051% |
| Silver | 109.0 oz./ton |
| Lead | 44.22% |
| Zinc | 2.72% |

From a review of the results set forth in Tables I and II and a comparison with Table III, it can be shown that the optimal results are obtained at a chloride ion concentration of 0.1 M, sulfuric acid concentration of 1.0 M, and at a temperature of 50°C or greater. An increase in the sodium chloride concentration to 2.0 M results in a higher percentage of bismuth dissolved, however, a marked increase in the silver dissolved is also obtained thereby indicating the desirability of a lower chloride ion concentration to avoid the excess dissolution of silver.

EXAMPLE 3

A similar evaluation was made of flue dust residue from a copper smelter. The analysis of the primary metallic constituents of the copper smelter flue dust residue is presented in Table IV, below:

TABLE IV

| ANAYSIS OF COPPER SMELTER FLUE DUST RESIDUE | |
|---|---|
| METAL | PERCENT |
| Bismuth | 3.3% |
| Copper | 7.3% |
| Lead | 39.5% |
| Zinc | 3.3% |
| Silver | 13.0 oz./ton |

From Table IV it should be noted that the bismuth concentration is high enough to warrant its recovery as a primary product rather than its probable disposal as an impurity as in Examples 1 and 2.

As in Examples 1 and 2, excellent bismuth dissolution was attained through an elevated temperature, acid chloride leach. Similar phenomena were observed, that is, the selective dissolution of bismuth was enhanced at higher leach liquor temperatures and sulfuric acid concentrations while the chloride ion concentration was maintained within relatively critical limits. Insufficient chloride ion concentration resulted in insufficient bismuth dissolution whereas excessive chloride ion levels resulted in a nonselective leach. In the latter instance it was found that significant quantities of silver and lead compounds were dissolved. Importantly, it was found that the optimum chloride ion concentration, as in Examples 1 and 2, appeared to be about 0.1 molar and less than 0.2 molar chloride ions even though the bismuth level in this example was significantly higher than in Examples 1 and 2.

This determination, Example 3, was made on a sample of copper flue dust residue, the analysis of which is presented in Table IV, at a leach temperature of 95°C and a 2.0 molar sulfuric acid concentration. The results are set forth in Table V, below:

TABLE V

| ACID CHLORIDE LEACH (4 HOURS) | | | | | |
|---|---|---|---|---|---|
| CHLORIDE ION CONCENTRATION | METALS DISSOLUTION | | | | |
| | Bismuth | Silver | Lead | Zinc | Copper |
| 0.1 M | 79.5% | 1.6% | 0.1% | 99.4% | 85% |
| 0.2 | 93.5 | 3.2 | 0.1 | 100.0 | 90.5 |

In this particular example, the copper smelter flue dust residue was leached directly with the acid chloride leach in place of following the customary water and acid leaching steps as illustrated in FIG. 1. The only probable difference in results obtained (if the procedure of Example 1 would have been followed) would be that most of the zinc and copper would probably have already been removed by the water and acid leaching steps.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A process for selectively removing bismuth from oxidized particulate materials comprising oxides of at least one of the metals selected from the group consisting of lead and silver, the process comprising the steps of:

obtaining oxidized particulate bismuth material including metals selected from the group consisting of lead and silver;

leaching the oxidized particulate material with an acidic chloride leach comprising sulfuric acid having an acidity greater than 0.1 Molar and a chloride ion concentration within the range on the order of about 0.05 to 0.2 Molar and at an elevated temperature thereby selectively dissolving bismuth; and separating the dissolved bismuth from the material.

2. A process as defined in claim 1 wherein the obtaining step comprises subjecting a flue dust to a roasting process at 450°C thereby providing said oxidized particulate material.

3. A process as defined in claim 1 wherein the leaching step further comprises providing a leaching temperature greater than 50°C.

4. A process for selectively removing bismuth from oxidized particulate materials comprising oxides of at least one of the metals selected from the group consisting of lead and silver, the process comprising the steps of:

obtaining oxidized particulate bismuth material including metals selected from the group consisting of lead and silver;

assaying the oxidized particulate material for its bismuth content;

formulating an acidic chloride leach solution on the basis of the assaying step, the leach solution comprising sulfuric acid having an acidity greater than 0.1 Molar and insuring that the chloride ion concentration is held within the range on the order of about 0.05 to 0.2 Molar chloride ions;

leaching the oxidized particulate material with the acidic chloride leach solution thereby selectively dissolving the bismuth; and separating the dissolved bismuth from the oxidized particulate material.

5. A process as defined in claim 4 wherein the temperature of the acidic chloride leach solution is at least 50°C.

* * * * *